US012681436B2

(12) United States Patent
Di Domenico et al.

(10) Patent No.: US 12,681,436 B2
(45) Date of Patent: Jul. 14, 2026

(54) METHOD FOR DEVELOPING A RESONATOR MECHANISM WITH A ROTATING FLEXIBLE GUIDE TO REDUCE OUT-OF-PLANE OSCILLATIONS

(71) Applicant: The Swatch Group Research and Development Ltd, Marin (CH)

(72) Inventors: Gianni Di Domenico, Neuchatel (CH); Mohammad Hussein Kahrobaiyan, Boudevilliers (CH); Dominique Lechot, Les Reussilles (CH)

(73) Assignee: The Swatch Group Research and Development Ltd, Marin (CH)

( * ) Notice: Subject to any disclaimer, the term of this patent is extended or adjusted under 35 U.S.C. 154(b) by 214 days.

(21) Appl. No.: 18/599,503

(22) Filed: Mar. 8, 2024

(65) Prior Publication Data

US 2024/0310783 A1 Sep. 19, 2024

(30) Foreign Application Priority Data

Mar. 17, 2023 (EP) .................................... 23162547

(51) Int. Cl.
*G04B 17/04* (2006.01)

(52) U.S. Cl.
CPC .................................. *G04B 17/045* (2013.01)

(58) Field of Classification Search
CPC ...... G04B 17/04; G04B 17/32; G04B 7/1271; G04B 18/00; G04B 15/14; G04B 17/045
See application file for complete search history.

(56) References Cited

U.S. PATENT DOCUMENTS

| | | | | |
|---|---|---|---|---|
| 3,183,426 | A * | 5/1965 | Haydon | G04C 5/005 74/504 |
| 2016/0327908 | A1* | 11/2016 | Winkler | G04B 15/08 |
| 2016/0327909 | A1* | 11/2016 | Henein | G04B 23/005 |
| 2018/0231937 | A1* | 8/2018 | Kahrobaiyan | G04B 17/28 |

(Continued)

FOREIGN PATENT DOCUMENTS

| | | |
|---|---|---|
| CH | 715 562 A2 | 5/2020 |
| EP | 3 561 609 B1 | 3/2022 |
| EP | 4 425 273 A1 | 9/2024 |

OTHER PUBLICATIONS

European Search Report issued Aug. 18, 2023 in European Application 23162547.6 filed on Mar. 17, 2023, 3 pages (with English Translation of Categories of Cited Documents).

*Primary Examiner* — Sean Kayes

(74) *Attorney, Agent, or Firm* — Oblon, McClelland, Maier & Neustadt, L.L.P.

(57) ABSTRACT

A method of setting up a resonator mechanism for timepieces, including a structure and an anchoring block from which is suspended at least one inertial element subjected to return forces exerted by a flexible pivot including a plurality of resilient blades deformable essentially in a plane XY perpendicular to the first direction Z, the anchoring block being suspended from the structure by a flexible suspension, the method including measuring a reference oscillation frequency of the inertial element about the Z direction in the XY plane, measuring a secondary oscillation frequency of the inertial element, comparing the secondary oscillation frequency with the reference oscillation frequency, adapting flexible suspension or substituting flexible suspension with another flexible suspension.

12 Claims, 3 Drawing Sheets

(56) References Cited

U.S. PATENT DOCUMENTS

| | | | | |
|---|---|---|---|---|
| 2019/0079454 | A1* | 3/2019 | Semon | G04B 15/06 |
| 2019/0120287 | A1* | 4/2019 | Cosandier | G04B 31/06 |
| 2019/0324401 | A1 | 10/2019 | Winkler et al. | |
| 2019/0377302 | A1* | 12/2019 | Karapatis | G04B 15/06 |
| 2020/0073329 | A1* | 3/2020 | Semon | G04B 15/08 |
| 2021/0356911 | A1* | 11/2021 | Di Domenico | G04B 43/00 |
| 2023/0195034 | A1* | 6/2023 | Stranczl | G04B 15/14 368/124 |
| 2024/0310783 | A1* | 9/2024 | Di Domenico | G04B 17/045 |

* cited by examiner

METHOD FOR DEVELOPING A RESONATOR MECHANISM WITH A ROTATING FLEXIBLE GUIDE TO REDUCE OUT-OF-PLANE OSCILLATIONS

CROSS-REFERENCE TO RELATED APPLICATION

This application claims priority to European Patent Application No. 23162547.6 filed on Mar. 17, 2023, the entire disclosure of which is hereby incorporated herein by reference.

TECHNICAL FIELD OF THE INVENTION

The invention relates to a method of developing a clockwork resonator mechanism, comprising a structure and an anchoring block from which at least one inertial element is suspended, a virtual pivot comprising a plurality of substantially longitudinal elastic blades, each fixed at a first end to said anchoring block and at a second end to said inertial element.

The invention relates to the field of clock resonators, particularly those comprising elastic blades acting as return means for the oscillator.

TECHNOLOGICAL BACKGROUND

The torsional stiffness of the suspension is a delicate point for most watch oscillators comprising at least one coil spring or elastic blades constituting a flexible guide, and in particular for resonators with crossed blades. Shock resistance also depends on this torsional stiffness; in fact, during shocks, the stress undergone by the blades quickly reaches very high values, which reduces the distance that the part can travel before giving up. Shock absorbers for timepieces come in many variants. However, their main purpose is to protect the fragile pivots of the resonator axis, and not the elastic elements, such as the traditional coil spring.

New mechanism architectures make it possible to maximise the quality factor of a resonator, by using a flexible guide with the use of a lever escapement with a very small angle of lift, according to application CH15442016 in the name of ETA Manufacture Horlogère Suisse and its derivatives, the teachings of which are directly usable in the present invention, and whose resonator can be further improved with regard to its sensitivity to shocks, in certain particular directions. The aim is therefore to protect the blades from breaking in the event of an impact. The anti-shock systems proposed to date for resonators with flexible guides protect the blades from shocks in certain directions only, but not in all directions, or else they have the defect of allowing the virtual pivot to move slightly according to its oscillation rotation, which should be avoided as far as possible.

Application CH5182018 or application EP18168765 in the name of ETA Manufacture Horlogère Suisse describes a watch resonator mechanism, comprising a structure carrying, by means of a flexible suspension, an anchoring block from which is suspended an inertial element oscillating according to a first rotational degree of freedom RZ, under the action of return forces exerted by a virtual pivot comprising first elastic blades each fixed to said inertial element and to said anchoring block, the flexible suspension being arranged to allow a certain mobility of the anchoring block in all degrees of freedom other than the first rotational degree of freedom RZ in which only the inertial element is movable to avoid any disturbance of its oscillation, and the stiffness of the suspension in the first rotational degree of freedom RZ is much greater than the stiffness of the virtual pivot in this same first rotational degree of freedom RZ.

Application CH715526 or application EP3561607 in the name of ETA Manufacture Horlogère Suisse describes a clock resonator mechanism, comprising a structure and an anchoring block from which is suspended at least one inertial element arranged to oscillate with a first degree of freedom in rotation RZ about a pivot axis extending in a first direction Z, said inertial element being subjected to return forces exerted by a virtual pivot comprising a plurality of substantially longitudinal resilient blades, each fixed at a first end to said anchoring block and at a second end to said inertial element, each said resilient blade being deformable essentially in a plane XY perpendicular to said first direction Z.

When the resonator mechanism is in operation, the inertial element performs an oscillatory movement about the Z direction in the XY plane with a reference oscillation frequency. In addition, the inertial element performs rotary secondary oscillations about the X direction on the one hand, and about the Y direction on the other. These secondary oscillations are oscillatory modes known as “out of plane”, i.e. outside the XY plane.

These “out-of-plane” secondary oscillations have a more or less limited effect on the movement of the regulating organ.

However, if the frequency of these secondary oscillations is a multiple of the reference frequency of the inertial element in the XY plane, the secondary oscillations are larger and disturb the operation of the oscillator. It is therefore important to ensure that the frequency of the secondary oscillations differs by a multiple of the reference frequency.

SUMMARY OF THE INVENTION

The invention proposes to improve the resonator mechanism of the CH715526 application or the EP3561607 application in the name of ETA Manufacture Horlogère Suisse in order to improve the flexible suspension and avoid the disadvantages mentioned above.

To this end, the invention relates to a method of developing a resonator mechanism for a timepiece, comprising a structure and an anchoring block from which is suspended at least one inertial element arranged to oscillate with a first degree of freedom in rotation RZ about a pivot axis extending in a first direction Z, said inertial element being subjected to return forces exerted by a virtual pivot comprising a plurality of substantially longitudinal resilient blades, each fixed at a first end to said anchoring block and at a second end to said inertial element, each said elastic blade being deformable essentially in a plane XY perpendicular to said first direction Z, said anchoring block being suspended from said structure by a flexible suspension arranged to allow the mobility of said anchoring block.

The invention is remarkable in that the method comprises:

- a first step of measuring a reference oscillation frequency of the inertial element about the Z direction in the XY plane;
- a second step of measuring at least one secondary oscillation frequency of the inertial element about the X direction in the YZ plane, or about the Y direction in the XZ plane;
- a third step of comparing the secondary oscillation frequency with the reference oscillation frequency, to verify that the secondary oscillation frequency has a value substantially different from a multiple of the reference oscillation frequency; and in the case where the secondary oscillation frequency has a value close to or substantially equal to a multiple of the reference oscillation frequency, a fourth step of adapting the flexible suspension or substituting the flexible suspension with another flexible suspension, so as to have a flexible suspension configuration modified such that the secondary oscillation frequency is substantially different from a multiple of the reference oscillation frequency.

With this method, a resonator mechanism is developed that controls and avoids significant secondary oscillations about the X and Y directions in planes perpendicular to the XY plane of oscillation, such as the XZ or YZ planes. This makes the resonator mechanism more precise.

Furthermore, the modification or substitution of the flexible suspension described in this method has no appreciable effect on the reference oscillations about the Z direction.

According to a particular embodiment of the invention, said flexible suspension comprising, between said anchoring block and a first intermediate mass, which is fixed to said structure directly or by means of a flexible plate in said first direction Z, a transverse translation table with a flexible guide and comprising at least two transverse, preferably straight, flexible blades or rods extending in said second direction X and symmetrically about a transverse axis crossing said pivot axis, the first secondary oscillation frequency measured in the second step is about the direction Y in the plane XZ.

According to a particular embodiment of the invention, the fourth step consists in substituting or adapting said flexible suspension by modifying the number of transverse flexible blades or rods of the transverse translation table.

According to a particular embodiment of the invention, the fourth step consists in substituting or adapting said flexible suspension, by modifying the stiffness of the transverse flexible blades or rods of the transverse translation table.

In a particular embodiment of the invention, the stiffness is modified by changing the thickness or length of the transverse flexible blades or rods of the transverse translation table.

According to a particular embodiment of the invention, the fourth step consists in substituting or adapting said flexible suspension by increasing the distance between at least two transverse flexible blades or rods of the transverse translation table, or even between all the transverse flexible blades or rods of the transverse translation table.

According to a particular embodiment of the invention, said flexible suspension comprising, between said anchoring block and a second intermediate mass, a flexibly guided longitudinal translation table, and comprising at least two longitudinal flexible blades or rods, preferably rectilinear, and extending in said third direction Y and symmetrically about a longitudinal axis crossing said pivot axis, the secondary oscillation frequency measured in the second step is about the direction X in the plane YZ.

According to a particular embodiment of the invention, the fourth step consists in substituting or adapting said flexible suspension by modifying the number of longitudinal flexible blades or rods of the longitudinal translation table.

According to a particular embodiment of the invention, the fourth step consists in substituting or adapting said flexible suspension by modifying the stiffness of the longitudinal flexible blades or rods of the longitudinal translation table.

According to a particular embodiment of the invention, the stiffness is modified by changing the thickness or length of the longitudinal flexible blades or rods of the longitudinal translation table.

According to a particular embodiment of the invention, the fourth step consists in substituting or adapting said flexible suspension by increasing the distance between at least two longitudinal flexible blades or rods, or even between all the longitudinal flexible blades or rods of the longitudinal translation table.

According to a particular embodiment of the invention, the same reference oscillation frequency is maintained in the fourth stage as that measured in the first stage.

BRIEF DESCRIPTION OF THE FIGURES

Further features and advantages of the invention will become apparent from the following detailed description, with reference to the attached drawings, wherein.

DETAILED DESCRIPTION OF THE INVENTION

Figure 1:
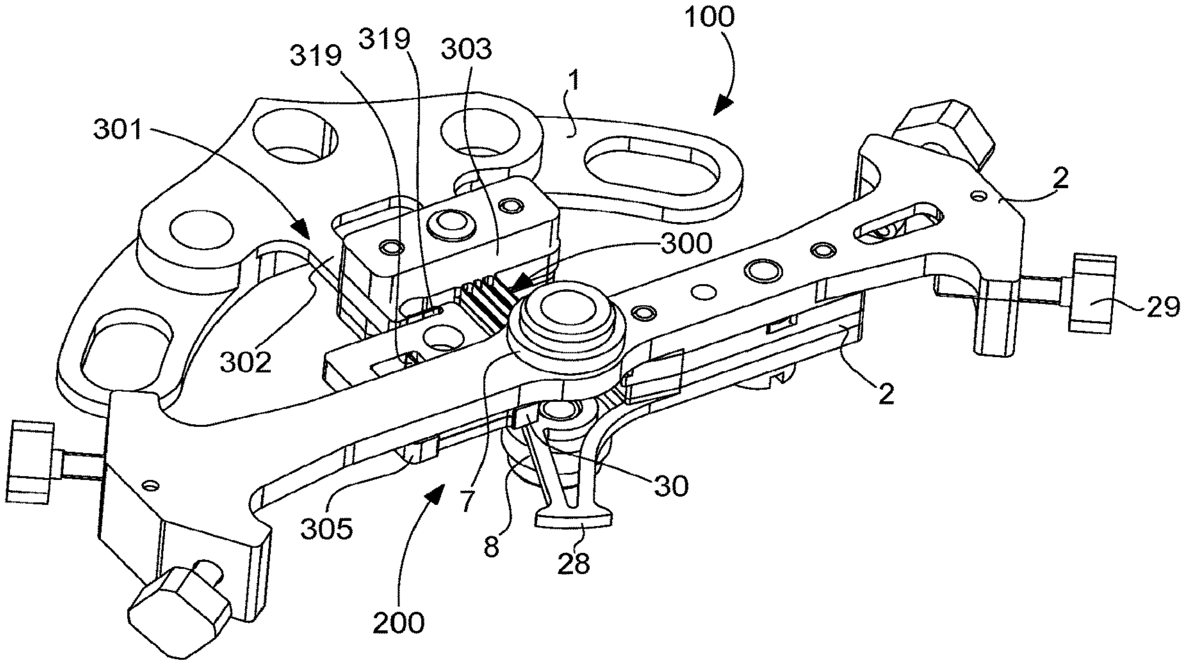
FIG. 1 shows a schematic perspective view of a resonator mechanism with elastic blades, comprising an inertial mass suspended from an anchoring block by a virtual pivot.
Figure 2:
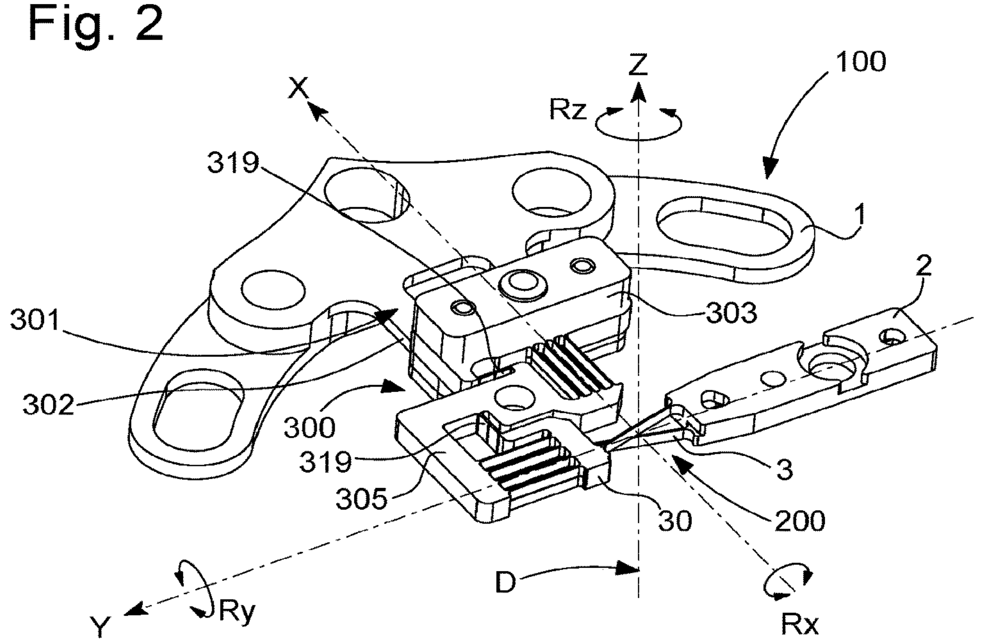
FIG. 2 shows, in schematic form and perspective, a mechanism with the different degrees of freedom of the inertial mass included in the resonator mechanism of FIG. 1; the balance wheel is removed to reveal the flexible guide with the two projecting crossed elastic blades, as well as the two translation tables.
Figure 3:
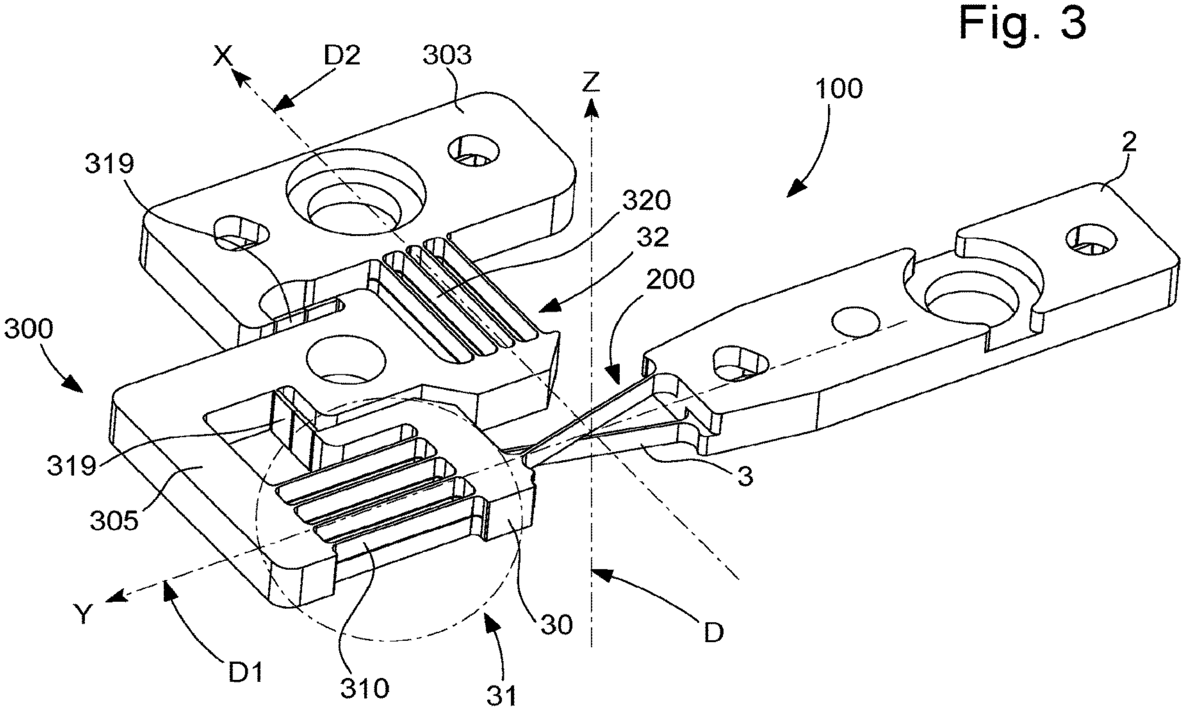
FIG. 3 shows part of the spring leaf resonator mechanism shown in FIG. 2, in particular the flexible suspension and the flexible pivot.

The invention relates to a method 40 for adjusting a clock resonator mechanism, for example, such as that shown in FIGS. 1 to 3. The tuning process 40 according to the invention is described in detail later in the description.

Shown in FIGS. 1 to 3, this embodiment of a clockwork resonator mechanism 100 comprises a structure 1 and an anchoring block 30, from which is suspended at least one inertial element 2 arranged to oscillate with a first rotational degree of freedom RZ about a pivot axis D extending in a first direction Z. The inertial element 2 comprises a balance 20. The pendulum is bone-shaped, the pendulum comprising a straight segment with a bulb at each end. Each bulb may comprise small weights 29 for adjusting the inertia of the inertial element 2. This inertial element 2 is subjected to return forces exerted by a virtual pivot 200 comprising a plurality of substantially longitudinal elastic blades 3, each fixed at a first end to the anchoring block 30, and at a second end to the inertial element 2. Each elastic blade 3 is deformable essentially in a plane XY perpendicular to the first direction Z.

The anchoring block 30 is suspended from the structure 1 by a flexible suspension 300, which is arranged to allow mobility of the anchoring block 30 according to five flexible degrees of freedom of the suspension, which are:

- a first degree of freedom in translation along the first direction Z;
- a second degree of freedom in translation along a second direction X orthogonal to the first direction Z;
- a third degree of freedom in translation along a third direction Y orthogonal to the second direction X and the first direction Z;
- a second rotational degree of freedom RX about an axis extending in the second direction X; and
- a third degree of freedom in rotation RY about an axis extending in the third direction Y.

The principle is to use the torsional flexibility of a translation table to better manage the torsional stiffness of the suspension. For this purpose, the blades of the XY tables are oriented so that the direction of greatest torsional flexibility is towards the axis of rotation of the resonator. Their torsional flexibility is managed by moving the blades closer together.

The flexible suspension 300 thus comprises, between the anchoring block 30 and a first intermediate mass 303, which is fixed to the structure 1 directly or by means of a plate 301 which is flexible in the first direction Z, a transverse translation table 32 which is flexibly guided and which comprises transverse blades 320 or transverse flexible rods which are straight and extend in the second direction X.

In a particular non-limiting embodiment, and as illustrated by the figures, the flexible suspension 300 also comprises, between the anchoring block 30 and a second intermediate mass 305, a flexibly guided longitudinal translation table 31, which comprises longitudinal blades 310 or longitudinal flexible rods, which are straight and extend in the third direction Y. And, between the second intermediate mass 305 and the first intermediate mass 303, the flexibly guided transverse translation table 32 comprises transverse blades 320 or transverse flexible rods, which are straight and extend in the second direction X.

More specifically, the longitudinal axis D1 intersects the transverse axis D2, and in particular the longitudinal axis D1, the transverse axis D2 and the pivot axis D are concurrent.

More particularly, the longitudinal translation table 31 and the transverse translation table 32 each comprise at least two flexible blades or rods, each blade or rod being characterised by its thickness in the second direction X when the blade or rod extends in the third direction Y or vice versa, by its height in the first direction Z, and by its length in the direction in which the strip or rod extends, the length being for example at least five times greater than the height, the height being at least as large as the thickness, and more particularly at least five times greater than this thickness, and still more particularly at least seven times greater than this thickness.

More particularly, the transverse translation table 32 comprises at least two transverse flexible blades or rods, parallel to each other and of the same length. FIGS. 1 to 3 illustrate a non-limiting variant with four parallel transverse slats and, more particularly, each consisting of two half-slats arranged on two overlapping levels and extending in extension of each other in the first direction Z. These half-blades may either be completely free of each other, or they may be bonded together by gluing or the like, or by growth of $SiO_2$ in the case of a silicon version, or the like. Of course, the longitudinal translation table 31, where it exists since it is optional, can obey the same construction principle. The number, arrangement and cross-section of these blades or rods may vary without departing from the present invention.

The principle is to use the torsional flexibility of a translation table to better manage the torsional stiffness of the suspension. For this purpose, the blades of the XY tables are oriented so that the direction of greatest torsional flexibility is towards the axis of rotation of the resonator. Their torsional flexibility is managed by moving the blades towards or away from each other.

The flexible suspension 300 thus comprises, between the anchoring block 30 and a first intermediate mass 303, which is fixed to the structure 1 directly or by means of a plate 301 which is flexible in the first direction Z, a transverse translation table 32 which is flexibly guided and which comprises transverse blades 320 or transverse flexible rods which are straight and extend in the second direction X.

In a particular non-limiting embodiment, and as illustrated by the figures, the flexible suspension 300 also comprises, between the anchoring block 30 and a second intermediate mass 305, a flexibly guided longitudinal translation table with flexible guidance 31, which comprises longitudinal blades 310 or longitudinal flexible rods, which are straight and extend in the third direction Y. And, between the second intermediate mass 305 and the first intermediate mass 303, the flexibly guided transverse translation table 32 comprises transverse blades 320 or transverse flexible rods, which are straight and extend in the second direction X.

More specifically, the longitudinal axis D1 intersects the transverse axis D2, and in particular the longitudinal axis D1, the transverse axis D2 and the pivot axis D are concurrent.

More particularly, the longitudinal translation table 31 and the transverse translation table 32 each comprise at least two flexible blades or rods, each blade or rod being characterised by its thickness in the second direction X when the blade or rod extends in the third direction Y or vice versa, by its height in the first direction Z, and by its length in the direction in which the strip or rod extends, the length being for example at least five times greater than the height, the height being at least as large as the thickness, and more particularly at least five times greater than this thickness, and still more particularly at least seven times greater than this thickness.

More particularly, the transverse translation table 32 comprises at least two transverse flexible blades or rods, parallel to each other and of the same length. FIGS. 1 to 3 illustrate a non-limiting variant with four parallel transverse slats and, more particularly, each consisting of two half-slats arranged on two overlapping levels and extending in extension of each other in the first direction Z. These half-blades may either be completely free of each other, or they may be bonded together by gluing or the like, or by growth of $SiO_2$ in the case of a silicon version, or the like. Of course, the longitudinal translation table 31, where it exists since it is optional, can obey the same construction principle. The number, arrangement and cross-section of these blades or rods may vary without departing from the present invention.

More particularly, the transverse blades or rods of the transverse translation table 32 have a first plane of symmetry, which is parallel to the transverse axis D2, and which passes through the pivot axis D.

More particularly, the transverse blades or rods of the transverse translation table 32 have a second plane of symmetry, which is parallel to the transverse axis D2, and orthogonal to the pivot axis D.

In one variant, not shown in the figures, the longitudinal blades or straight flexible rods 310 are rods with a square or circular cross-section, the height of which is equal to the thickness.

In a particular variant, the resonator mechanism 100 comprises a plate 301, comprising at least one flexible blade 302 extending in a plane perpendicular to the pivot axis D, and fixed to the structure 1 and to the first intermediate mass 303, and which is arranged to allow mobility of the first intermediate mass 303 in the first direction Z. More particularly, the plate 301 comprises at least two coplanar flexible blades 302. However, such a plate 301 is optional if the height of the blades of the XY translation tables is small compared to the height of the flexible blades 3, in particular less than a third of the height of the flexible blades 3.

In one particular variant, the flexible suspension 300 is made in one piece, preferably from silicone.

In an advantageous embodiment, the resonator mechanism 100 comprises a monobloc assembly, which groups together at least the anchoring block 30, a base of the at least one inertial element 2, the flexible pivot 200, the flexible suspension 300, the first intermediate mass 303, and the transverse translation table 32, and comprises at least one breakable element 319 arranged to secure the components of the monobloc assembly during their assembly on the structure 1, and the breaking of which releases all the movable components of the monobloc assembly.

More particularly, the monobloc assembly also comprises at least the second intermediate mass 305 and the longitudinal translation table 31.

As explained above, the technology used for manufacture makes it possible to obtain two distinct blades at the height of a silicon wafer, which favours the torsional flexibility of the table without softening it for translation. And the resonator mechanism 100 can thus advantageously comprise at least two superimposed elementary monobloc assemblies, which each group together a level of the anchoring block 30, and/or of a base of the at least one inertial element 2, and/or of the flexible pivot 200, and/or of the flexible suspension 300, and/or of the first intermediate mass 303, and/or of the transverse translation table 32, and/or of a breakable element 319; each elementary monobloc assembly may be joined to at least one other elementary monobloc assembly by bonding or the like, by mechanical joining, or by growth of $SiO_2$ in the case of a silicon version, or the like.

More particularly, such an elementary monobloc assembly also comprises at least one level of the second intermediate mass 305 and/or the longitudinal translation table 31.

According to the invention, a tuning method 40 for the clock resonator mechanism is used to avoid significant secondary oscillations in planes perpendicular to the XY plane.

Figure 4:
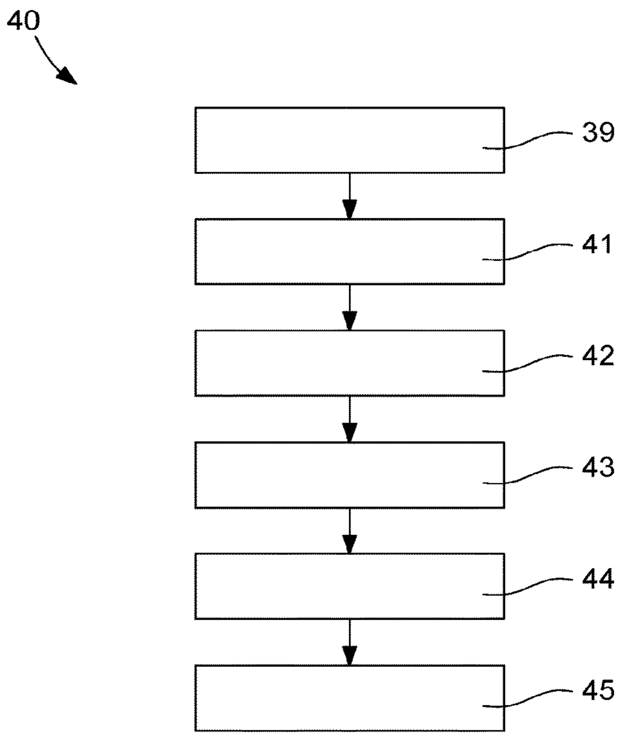
FIG. 4 shows a schematic diagram of the steps in the process of developing the resonator mechanism according to the invention.

Shown in FIG. 4, the method 40 comprises a first step 41 of measuring a reference oscillation frequency of the inertial element 2 about the Z direction in the XY plane. To this end, the number of oscillations of the inertial element 2 per second is measured. For example, a measurement method using a laser system is used, which is known to one skilled in the art.

In a second step 42, a secondary oscillation frequency of the inertial element 2 is measured in a plane substantially perpendicular to the XY plane. For example, the oscillation frequency of the inertial element 2 is measured about the X direction in the YZ plane, or about the Y direction in the XZ plane. Preferably, the secondary oscillation frequency is measured about the X and Y directions in both the XZ and YZ planes.

A third step 43 consists of comparing the secondary oscillation frequency or frequencies with the reference oscillation frequency. More specifically, it is checked whether the secondary oscillation frequency has a value substantially different from a multiple of the reference oscillation frequency. If the secondary oscillation frequency has a value substantially different from a multiple of the reference oscillation frequency, the flexible suspension 300 does not need to be modified or replaced.

On the other hand, if the secondary oscillation frequency has a value close to or substantially equal to a multiple of the reference oscillation frequency, the method 40 comprises a fourth step 44. The fourth step 44 consists in either adapting the flexible suspension 300, or substituting the flexible suspension 300 with another flexible suspension, so as to have a different geometric configuration from the flexible suspension 300.

Thanks to this new geometry, the secondary oscillation frequency changes, so that a secondary oscillation frequency can be chosen that is substantially different from a multiple of the reference oscillation frequency.

Preferably, the same reference oscillation frequency is maintained in the fourth step as that measured in the first step. In other words, only the secondary oscillation frequency or frequencies are modified by the modification or substitution of the flexible suspension, but the reference frequency remains unchanged.

Preferably, in the case of substitution, the flexible suspension 300 is substituted with another flexible suspension whose oscillatory properties, in particular the frequency or frequencies of secondary oscillations, are already known.

The method 40 may therefore include a preliminary step 39 of measuring the reference frequency and the secondary oscillation frequency or frequencies of a plurality of flexible suspensions having different configurations or geometries. The flexible suspensions are classified, for example, according to their oscillatory properties, in particular according to their secondary oscillation frequencies.

The method 40 may also include a fifth verification step 45 in which the secondary oscillation frequency is measured after the flexible suspension 300 has been adapted or substituted to verify that a value other than a multiple of the reference oscillation frequency is obtained. Thus, if necessary, the flexible suspension 300 can be modified or substituted again if the secondary oscillation frequency measured is not satisfactory.

In the variant for adapting the flexible suspension 300, the geometry of the flexible suspension 300 is modified, for example by acting on the flexible blades or flexible rods.

In a first embodiment, the fourth step consists of substituting or adapting said flexible suspension 300 by modifying the number of transverse 320 and/or longitudinal 310 flexible blades or rods. In each translation table 31, 32, there may be more or fewer flexible blades or rods 310, 320 than the original configuration of the flexible suspension 300.

For the case where the secondary oscillation frequency is in the XZ plane, the number of blades or transverse flexible rods 320 of the transverse translation table 32 is modified. For the case where the secondary oscillation frequency is in the YZ plane, the number of blades or longitudinal flexible rods 310 of the longitudinal translation table 31 is modified.

Figure 5:
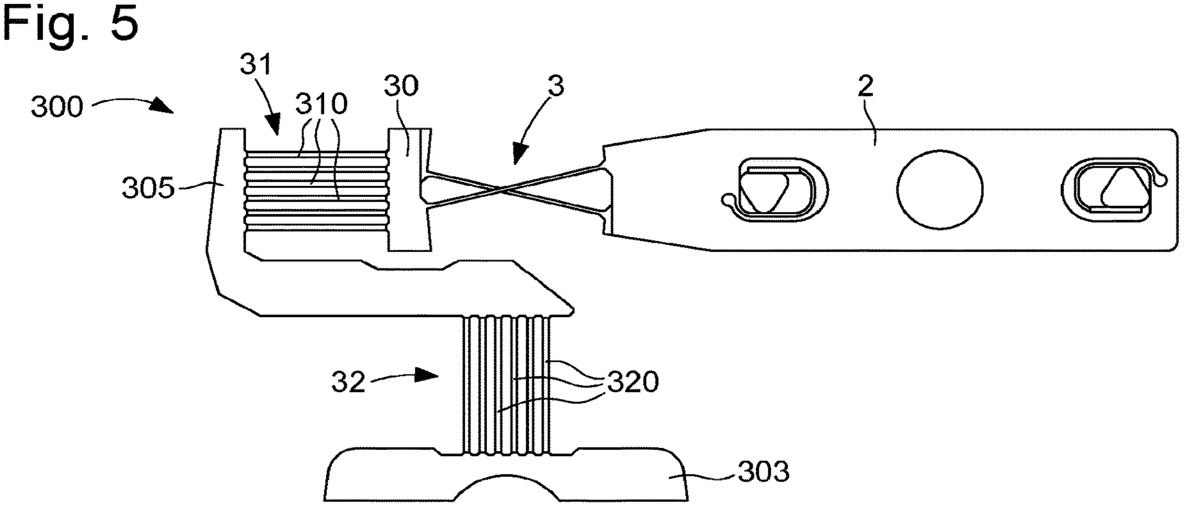
FIG. 5 shows a first embodiment of a flexible suspension potentially used in the process according to the invention.

FIG. 5 shows a flexible suspension 300 provided with a longitudinal translation table 31 comprising six longitudinal flexible blades or rods 310 between the anchoring block 30 and the second intermediate mass 305. The flexible suspension 300 is also provided with a transverse translation table 32 comprising six transverse flexible blades or rods 320 between the first intermediate mass 303 and the second intermediate mass 305. Thus, each translation table 31, 32 comprises one or two flexible blades or rods 310, 320 in addition to the original flexible suspension shown in FIG. 3.

A second method of implementing the fourth step 44 consists in substituting or adapting said flexible suspension 300 by modifying the stiffness of the longitudinal 310 or transverse 320 flexible blades or rods of the flexible suspension 300.

Figure 6:
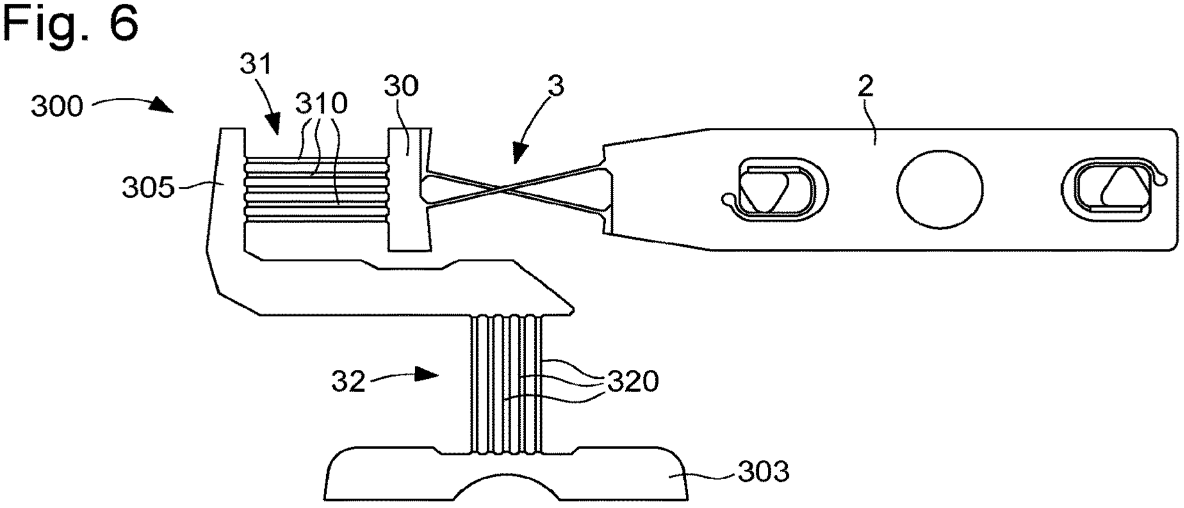
FIG. 6 shows a second embodiment of a flexible suspension potentially used in the process according to the invention.

For example, the thickness of the longitudinal 310 or transverse 320 flexible blades or rods can be adapted, or the length of the longitudinal 310 or transverse 320 flexible blades or rods can be adapted to modify their stiffness. In FIG. 6, the flexible blades or rods 310, 320 of the flexible suspension 300 are thicker than the flexible blades of the original flexible suspension.

In a third embodiment, the fourth step 44 consists in increasing the distance between at least two longitudinal and/or transverse flexible blades or rods 310 and/or 320 of the longitudinal translation table 31 and/or transverse translation table 32 of the flexible suspension 300. By moving two flexible blades or rods 310, 320 away from each other, the secondary oscillation frequencies are modified.

Figure 7:
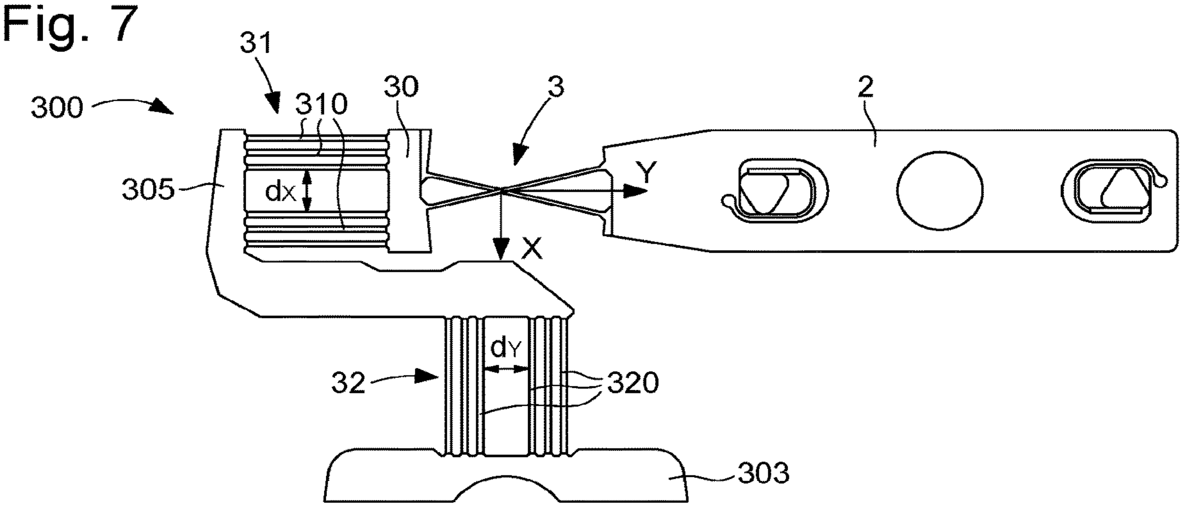
FIG. 7 shows a third embodiment of a flexible suspension potentially used in the process according to the invention.

For example, in FIG. 7, the flexible suspension 300 comprises, for each longitudinal translation table 31 or transverse translation table 32, two groups of flexible blades or rods 310, 320, separated from each other. The first three slats or rods are spaced apart by an equal first distance and the last three slats are spaced apart by the same first distance.

To separate the two groups of blades, the third and fourth flexible blades are separated by a second distance, respectively, $d_X$ and/or $d_y$ which is greater than the first distance. Other configurations of flexible suspension 300 are of course possible. For example, the distances between all the blades are equal, but with a distance greater or less than the original configuration.

Whatever the design, these adaptations or substitutions modify the secondary oscillation frequencies so that they are distant from the value of a multiple of the reference oscillation frequency of the inertial element in the XY plane.

Of course, the invention is not limited to the embodiments described with reference to the figures, and variants could be envisaged without departing from the scope of the invention.

The invention claimed is:

1. A method of setting up a resonator mechanism for a timepiece, comprising a structure and an anchoring block from which at least one inertial element is suspended arranged to oscillate with a first degree of freedom in rotation RZ about a pivot axis (D) extending in a first direction Z, said inertial element being subjected to return forces exerted by a flexible pivot comprising a plurality of substantially longitudinal resilient blades, each fixed at a first end to said flexible pivot, each fixed at a first end to said anchoring block, and at a second end to said inertial element, each said elastic blade being deformable essentially in a plane XY perpendicular to said first direction Z, said anchoring block being suspended from said structure by a flexible suspension arranged to allow mobility of said anchoring block, wherein the method comprises:

a first step of measuring a reference oscillation frequency of the inertial element about the Z direction in the XY plane;

a second step of measuring at least one secondary oscillation frequency of the inertial element about the X direction in the YZ plane or about the Y direction in the XZ plane;

a third step of comparing the secondary oscillation frequency with the reference oscillation frequency, to verify that the secondary oscillation frequency has a value substantially different from a multiple of the reference oscillation frequency; and in the case where the secondary oscillation frequency has a value close to or substantially equal to a multiple of the reference oscillation frequency, a fourth step of adapting flexible suspension or substituting flexible suspension with another flexible suspension, so as to have a configuration of flexible suspension modified such that the secondary oscillation frequency is substantially different from a multiple of the reference oscillation frequency.

2. The method of setting up according to claim 1, wherein said flexible suspension comprising, between said anchoring block and a first intermediate mass, which is fixed to said structure directly or with a plate flexible in said first direction Z, a transverse translation table with flexible guidance and comprising at least two transverse flexible blades or rods, and extending in said second direction X and symmetrically about a transverse axis (D2) crossing said pivot axis (D), the first secondary oscillation frequency measured in the second step is about the direction Y in the plane XZ.

3. The tuning method according to claim 2, wherein the fourth step includes substituting or adapting said flexible suspension by modifying the number of transverse flexible blades or rods of the transverse translation table.

4. The tuning method according to claim 2, wherein the fourth step includes substituting or adapting said flexible suspension, by modifying the stiffness of the transverse flexible blades or rods of the transverse translation table.

5. A setting method according to claim 4, wherein the stiffness of the transverse flexible blades or rods is modified by changing the thickness or length of the transverse flexible blades or rods of the transverse translation table.

6. The setting method according to claim 2, wherein the fourth step includes substituting or adapting said flexible suspension by increasing the distance ($d_y$) between at least two transverse flexible blades or rods of the transverse translation table, or even between all transverse flexible blades or rods of the transverse translation table.

7. The tuning method according to claim 1, wherein said flexible suspension comprising, between said anchoring block and a second intermediate mass, a longitudinal translation table with flexible guidance and comprising at least two longitudinal flexible blades or rods, and extending in said third direction Y and symmetrically about a longitudinal axis (D1) crossing said pivot axis (D), the secondary oscillation frequency measured in the second step is about the direction X in the plane YZ.

8. The tuning method according to claim 7, wherein the fourth step includes substituting or adapting said flexible suspension by modifying the number of longitudinal flexible blades or rods of the longitudinal translation table.

9. The tuning method according to claim 7, wherein the fourth step includes substituting or adapting said flexible suspension by modifying the stiffness of the longitudinal flexible blades or rods of the longitudinal translation table.

10. The setting method according to claim 9, wherein the stiffness of the longitudinal flexible blades or rods is modified by changing the thickness or length of the longitudinal flexible blades or rods of the longitudinal translation table.

11. The setting method according to claim 7, wherein the fourth step includes substituting or adapting said flexible suspension by increasing the distance ($d_X$) between at least two longitudinal flexible blades or rods, or even between all the longitudinal flexible blades or rods of the longitudinal translation table.

12. The tuning method according to claim 1, wherein the same reference oscillation frequency is maintained in the fourth step as that measured in the first step.

* * * * *